Feb. 2, 1926.

E. E. WEMP

CLUTCH

Filed Dec. 24, 1923     3 Sheets-Sheet 1

1,571,746

Inventor

Ernest E. Wemp

By Stuart C. Barnes.

Attorney

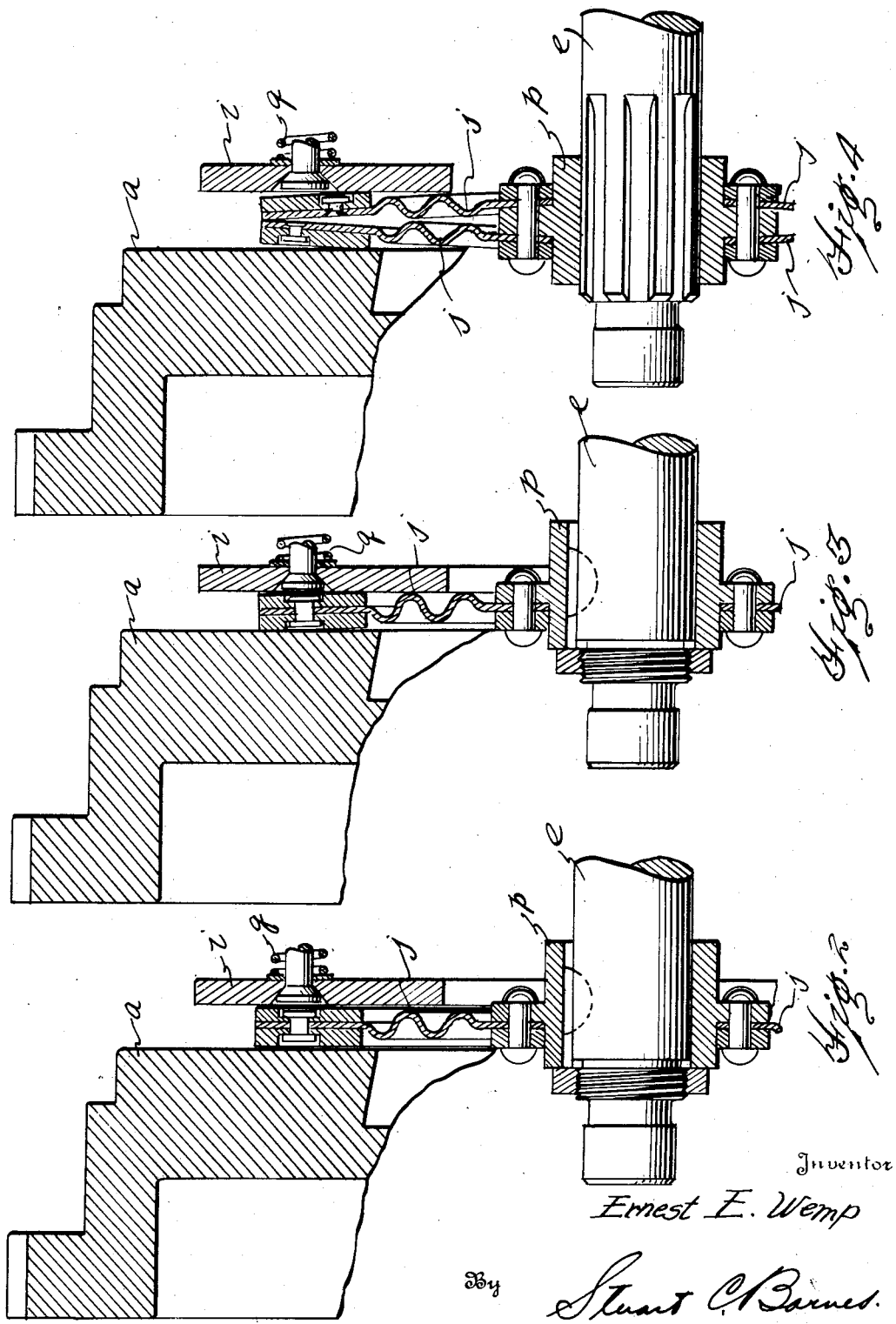

Feb. 2, 1926.  
E. E. WEMP  
CLUTCH  
Filed Dec. 24, 1923  
1,571,746  
3 Sheets-Sheet 3
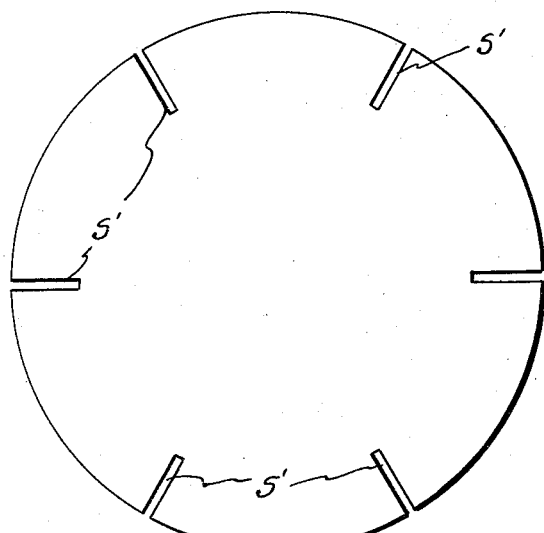
Fig. 5
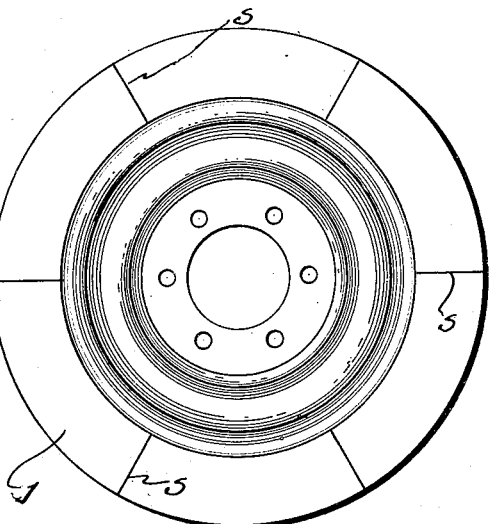
Fig. 6
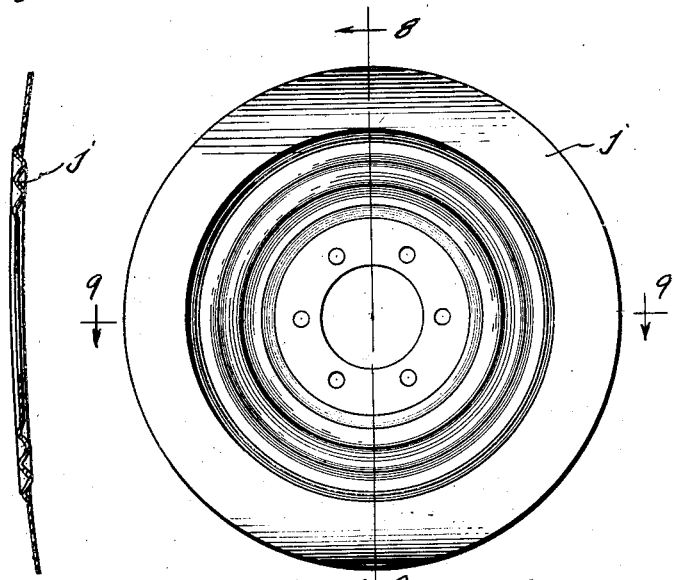
Fig. 8  Fig. 7
Fig. 10
Fig. 9
Inventor  
Ernest E. Wemp  
By Stuart C. Barnes  
Attorney Patented Feb. 2, 1926.

1,571,746

UNITED STATES PATENT OFFICE.

ERNEST E. WEMP, OF DETROIT, MICHIGAN.

CLUTCH.

Application filed December 24, 1923. Serial No. 682,445.

*To all whom it may concern:*

Be it known that I, ERNEST E. WEMP, a citizen of the United States, residing at Detroit, in the county of Wayne and State of Michigan, have invented certain new and useful Improvements in Clutches, of which the following is a specification.

This invention relates to clutches and especially clutches intended for use on automobiles, tractors, trucks, etc. It is the object of the present invention to provide a clutch which has a driven member that is radially extensible and contractible. A further object is to provide a clutch disc that is relatively rigid and strong when resisting torque by reason of presenting a column section to the torque stresses.

Chattering in engaging or disengaging a clutch is usually due to the fact that the driving members do not have exactly parallel faces when assembled, or have relatively thick portions on the driven members. The result is that in the engaging action the driven members first catch in the narrow spaces between the driving members and have a tendency to temporarily stick or wedge, then they suddenly break through such narrow places with a jerk resulting in an abrupt uneasy action which is known as chattering. These narrow spaces between the driving members or unduly high spots on the driving members are due to a variety of causes that are not exactly possible to eliminate in manufacturing. In the first place, the clutches are usually manufactured separately from the fly wheels of the cars on which the clutches are placed, hence, the failure of the clutch parts to all have the required dimensions is not always due to the negligence of the clutchmaker. In the second place, clutches for automobiles are made on large production plans and it is not always possible to make all the parts to the exact dimensions, especially the facings which may vary, plus or minus .005. This brings about these narrow places or the increased thickness in spots on the driving members.

It is the object of the present invention to provide a special form of disc which is so constructed and arranged that chattering is substantially eliminated by reason of the disc having only a gradual or progressive surface contact as the clutch is let in. This progressive increase of the area of contact can be accomplished in several ways.

In one general form of the invention it is accomplished by first bringing the facing in contact with the companion clutch part at the corner or corners, and in another general form of the invention it is accomplished by using a slightly warped or distorted disc. These general classes and the special modifications will be best understood after a general description is given of the various parts.

In the drawings:

Fig. 2 is a fragmentary vertical section showing another form of the improved disc with the clutch parts disengaged.

Fig. 3 is a similar view showing the clutch parts in process of engaging.

Fig. 4 is a similar view showing still a further modification.

Fig. 5 is a plan view of the flat type of disc before the same is stamped to shape.

Fig. 6 is a plan view of the same after the same has been stamped.

Figs. 7, 8, 9 and 10 are views of the warped type of disc which has a progressive increase of contact area.

Figure 1:
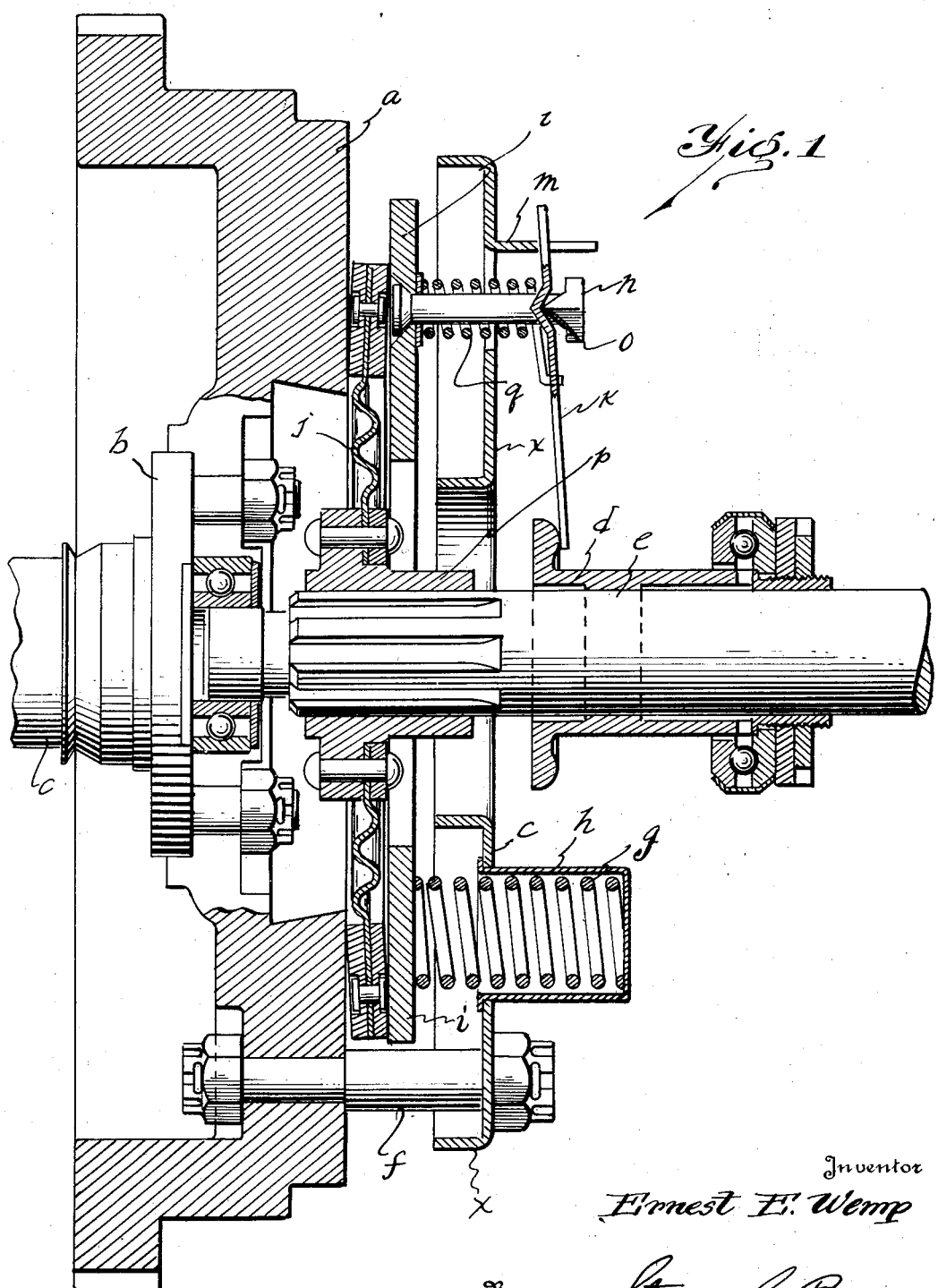
Fig. 1 is a cross section of the clutch and fly wheel showing one form of the disc.

$a$ designates the usual fly wheel which is bolted to the driving flange $b$ of the crank shaft $c$. $e$ represents the driven shaft, $d$ the clutch shifting sleeve, $x$ is an abutment plate bolted onto the ends of the driving studs $f$ in open and spaced relation with respect to the fly wheel. A plurality of clutch springs $g$ are contained within the spring cups $h$ that are set in the abutment plate. These thrust against the thrust ring $i$ which acts also as one of the driving members, there being only two driving members, viz: the face of the fly wheel and the thrust ring. However, it will be possible to use a greater number of driving and driven members.

The driven member is designated $j$ and is the improved disc which constitutes the present invention. The thrust ring is pulled back against the pressure of the clutch springs $g$ by the aid of the levers $k$ which are fulcrumed on the stamped-out posts $m$ and which are connected with the thrust ring $i$ by means of the tie bolts $n$ which have the knife edge contacts $o$ with the levers. The springs $q$ encircle the bolts and take up any lost motion to prevent rattling. This clutch construction in its general aspect, apart from the improved form of driven member, or disc, is shown and described more fully in my copending application No. 518,234.

I have already described the defects which cause chattering and have indicated that it is the object of the present invention to obviate these defects. To this end I have designed a new form of disc construction which can have a gradual increase of surface contact as the clutch is let in. There are several ways of accomplishing this. In the form shown in Fig. 1, the disc is carried on a sliding splined sleeve $p$ and the disc has its outer zone tipped slightly from a true perpendicular position with respect to the axis of the shaft. It may be tipped for a degree or a degree and a half. This is slightly exaggerated in the drawings. Now, obviously, when the clutch is let in it first has a line contact at the outside corner of the clutch facing at one side of the driven member and at the inside corner on the other side of the driven member. This line contact will gradually spread in dimensions as the pressure is allowed to increase and it will be a sort of rolling action in bringing the clutch facing into contact with the driving members. Obviously, these slight initial surface contacts are such as to escape being caught in the narrow places in the slot between the driving members so as to avoid the chattering which I have mentioned. The high spots may also yield to get out of the way due to the flexibility of the disc. However, the clutch parts will gradually take hold as the surface contact increases until finally full surface contact is reached. This results in a smooth non-chattering clutch action which is the desideratum in clutch building.

The same result can be obtained by using a disc which has its outer zone perpendicular to the axis of the shaft provided the center of the disc is fixedly anchored onto the shaft. In such a case, it is necessary to bend over the outer zone of the disc slightly as indicated in Fig. 3 in order to catch the facing between the two faces of the driving discs. This then results in the same corner-to-corner engagement that I have described in connection with Fig. 1, and works out in the same way to secure gradual and progressive increase of the area of contact.

In Fig. 4, another modification of the invention is shown. Here two discs are employed and they meet at their outer zones at an acute angle forming a slight tip for the facings of each disc, that is, they are slightly tipped with respect to a plane perpendicular with the axis of the shaft, hence here the driving faces engage both facings at the inside corner of the facings. This is in some respects a better form of construction for the reason that the initial grip of the discs is less than with the other forms. With the other forms of the invention where the contact starts at the outer corners of the facing at one side and the inner corners at the other, the grip has to be calculated with the mean effective radius of the disc. On the other hand, with the form of invention shown in Fig. 4, where the grip takes place at the inside corners, at both sides, the first torque is calculated with the radius from the center to the inside corners of the facings. Inasmuch as this torque is calculated by the formula:

$$T = \frac{P \times N \times R}{f}$$

in which formula, P is the pressure, N is the number of discs, R the radius and $f$ the coefficient of friction, it will be evident that the smaller the radius the less torque that will be initially communicated from the driving members to the driven member. This will result in easier clutch action.

A fourth form of the invention is achieved with a somewhat different disc construction, to wit,—that shown in Figs. 7 to 10 inclusive, wherein the whole disc is warped or distorted. This will obviously cause the point of contact to come at different points along the outer zone of the disc. Turning now to the disc itself it will be found that in order to get a satisfactory and controllable action of the disc, it is necessary that the outer zone of the disc have a flexible relation with respect to the center of the disc. In some of my prior applications I have described and claimed a spoked disc. Such a spoked disc does permit a flexing action of the outer zone, but a disc of this kind has to be made of a relatively heavy metal in order to resist the torque stresses and furthermore, the disc itself presents several manufacturing problems in the way of punching and tempering the discs. A plain slotted disc could not suffer the distortions which are necessary to get the gradual and progressive increase of contact area. Of course, it could be distorted but the distortions could in no way be controlled so that a reliable contact area with a substantial equal frictional engagement could be secured. In order to permit the distortions which are necessary to allow the outer zone to be rolled over into contact with the driving surfaces or even to permit the use of such a warped disc as is shown in Figs. 7 to 10 inclusive, it is necessary to have a disc that is radially extensible and contractible. This I accomplish by an annularly corrugated web section intervening between the center and the outer zone of the disc. This forms bellows-like folds which permits the disc to be displaced radially inward and radially outward.

In the form of disc shown in Figs. 5 and 6 the outer zone is divided into sectors.

These sectors are divided off by the slits s. These slits s were originally slots s' however, when the annular corrugations are formed these slots are closed up into slits. This slotting has two purposes, one dividing the disc up into radially contractible or expansible sections, and secondly, this is a manufacturing necessity, if a flat disc is to be secured. The reason for this is that the outer portions of the disc in the stamped operation are drawn in and consequently are subjected to compression stresses that will warp the disc unless these compression stresses are relieved at the slots s' as indicated. If the stresses are not relieved, a warped disc such as shown in Figs. 7 to 10 inclusive, will result. Here, of course, the warp is considerably exaggerated for the purpose of distinct illustration. However, a warped disc of this kind can be used and by reason of its very warping will achieve a progressive increase of the contact area of the driven member so as to in a measure avoid the chattering which I have explained. However, I prefer the other forms of the construction which have a better design from an engineering standpoint and a better regulated action.

Now it will be apparent that the annular corrugations permit this flexing action which I have alluded to at the same time they present a column section to the torque stresses and consequently make a disc of maximum rigidity to the torque. This permits the use of a much lighter gauge metal in forming the disc.

What I claim is:

1. In a clutch, a clutch disc which is substantially equally radially extensible and contractible along all of its radii and in which the outer zone of the disc is arranged to be deformed from its natural condition when the clutch is engaged.

2. In a clutch, a disc having annular corrugations to make the same radially flexible but resistant to torque and in which the outer zone of the disk is arranged to be deformed from its natural condition, when the clutch is engaged.

3. In a clutch, a disc having outer zone portions flexibly supported by a solid intervening web which is capable however of radial extension and contraction by reason of a plurality of bellows like annular corrugations.

4. In a clutch, the combination of driving and driven members having engaging faces and including a clutch disc having a radially extensible and contractible web and provided with an outer zone having clutch facings arranged to roll into contact with the adjacent engaging member on axes that are perpendicular to the radius of the disc.

5. In a clutch, the combination of driving and driven members having engaging faces and including a clutch disc provided with annular corrugations to form the web, and an outer slotted zone provided with clutch facing and which is distorted from its natural condition when the clutch is engaged.

6. In a clutch, the combination of driving and driven members having engaging faces and including a clutch disc provided with an outer zone slit into sectors and having an annularly corrugated intervening web, which is radially extensible and contractible to allow the distortion of the sectors in engaging the clutch.

7. In a clutch, the combination of driving and driven members having engaging faces and the driven member having outer zones cut into sectors and an annular corrugated and radially extensible intervening portion, the outer zone bearing clutch facing and being distortable when the clutch is engaged.

8. In a clutch, the combination of driving and driven members having flat engaging faces, and a driven shaft, one of said clutch members being in the form of a disc radially extensible and radially contractible and having its outer zone tipped angularly from a perpendicular position with respect to the axis of the shaft.

9. In a clutch, the combination of driving and driven members having engaging faces, and a driven shaft, one of the clutch members being a disc having an annular corrugated web and an outer zone tipped from a position perpendicular to the axis of the driven shaft.

10. In a clutch, the combination of driving and driven members having engaging faces, and a shaft, one of the said clutch members being a driven disc annularly corrugated between the center and the outside and having its outer zone bearing a clutch facing and normally tipped from a plane perpendicular to the axis of said shaft.

In testimony whereof I have affixed my signature.

ERNEST E. WEMP.